Patented Jan. 1, 1952

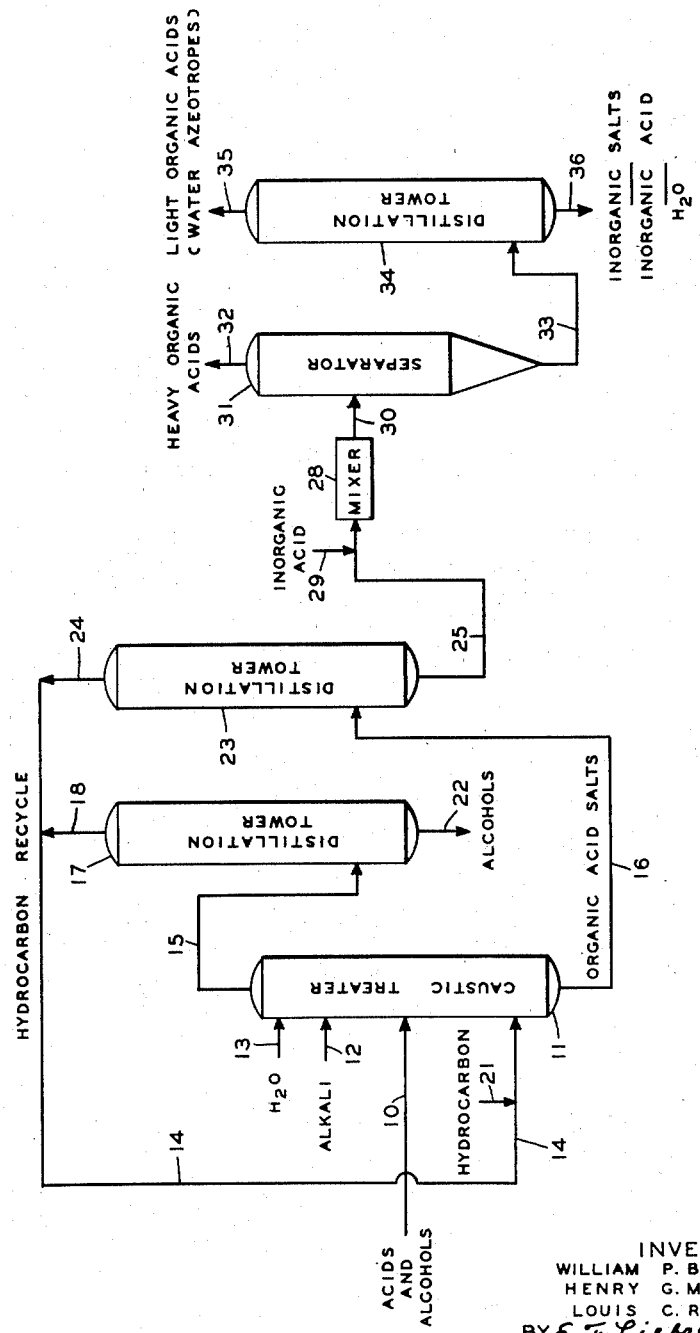

2,580,403

UNITED STATES PATENT OFFICE 2,580,403

SEPARATION OF ORGANIC ACIDS FROM ALCOHOLS

William P. Burton, Orange, Henry G. McGrath, Elizabeth, and Louis C. Rubin, West Caldwell, N. J., assignors to The M. W. Kellogg Company, Jersey City, N. J., a corporation of Delaware Application April 30, 1947, Serial No. 745,004

13 Claims. (Cl. 260—450)

This invention relates to the separation of organic compounds. In one of its more specific aspects, the invention relates to the separation of oxygenated organic compounds from the reaction product obtained in the reduction of oxides of carbon with hydrogen in the presence of a catalyst. More particularly, this invention is directed to an improved process for the separation of organic acids, alcohols, and other oxygenated organic compounds present in the reactor gases obtained from the aforementioned catalytic hydrogenation of oxides of carbon at elevated temperatures.

In the hydrogenation of oxides of carbon in the presence of a reducible metal catalyst at elevated temperatures, a reaction product is obtained in the form of reactor outlet gases at temperatures falling between about 300° F. to about 700° F., and containing oxygenated organic compounds comprising acids, alcohols, aldehydes, ketones and esters. These gases are passed through one or more condensation zones in which they are cooled to temperatures within the range from about 40° F. to about 150° F. to effect separation of the resulting condensate into a water-rich phase and an oil phase. Both phases contain oxygenated organic compounds, those of lower molecular weight tending to remain in the water phase, while those of higher molecular weight tend to remain in the oil or non-aqueous liquid phase.

At one stage in the process for the recovery of oxygenated organic compounds from the aforementioned oil or non-aqueous liquid phases, there is obtained a mixture of alcohols and organic acids, both water-insoluble, and containing relatively smaller quantities of other water-insoluble oxygenated organic compounds, comprising aldehydes, ketones and esters. It has been found that these organic acids may be separated from mixtures thereof with one or more of the aforementioned oxygenated organic compounds, by neutralizing the acids contained in such mixtures with an alkali, such as sodium hydroxide, to obtain aqueous solutions of salts of the aforementioned water-insoluble fatty organic acids. These salts may be next recovered from the remaining oxygenated organic compounds and separately neutralized with an inorganic acid, to obtain corresponding free organic acids.

In effecting the aforementioned neutralization of the acids with an alkali, we have found that when strong caustic solutions (5% or greater) are employed it is difficult to separate the resulting salts of the fatty organic acids from alcohols and other oxygenated organic compounds, by reason of the hydrotropic effect of the salts thus formed. Furthermore, we have found that this hydrotropic effect is increased with increased concentrations of alkali employed. On the other hand, when sufficiently dilute alkali is employed to obtain efficient separation of the salts from the aforementioned oxygenated organic compounds, the presence of increased quantities of water thus introduced, makes subsequent acid recovery undesirable from an economic standpoint.

The present invention, therefore, is directed to a process, as more fully hereinafter described, for separating water-insoluble organic acids from mixtures thereof with water-insoluble alcohols, or from such mixtures which contain in addition, other water-insoluble oxygenated organic compounds comprising aldehydes, ketones and esters. In general, the process comprises, broadly, the steps of neutralizing such mixtures with a strong alkaline solution to convert the organic acids contained therein to their corresponding organic salts, diluting the alkali to obtain desired concentrations and effecting separation of these salts from other oxygenated organic compounds by extracting the latter with a water-insoluble liquid organic or inorganic solvent.

We have found that such water-insoluble liquid solvents may be used as sulfur dioxide, halogenated compounds, ethers, esters and other water-insoluble liquid oxygenated organic compounds such as ethyl acetate, di-ethyl ketone and methyl butyl ketone.

In addition, we have found that overall generally satisfactory results have been obtained by employing, as a solvent, a hydrocarbon or a mixture of hydrocarbons, and preferably such a hydrocarbon or mixture of hydrocarbons, which does not form a minimum boiling azeotrope with oxygenated organic compounds in the aforementioned extract phase.

The insolubility of the solvent in the aqueous salt solution and its mutual solubility with the layer of oxygenated organic compounds, causes the phase separation to take place. The solvent is subsequently removed from both the layer of oxygenated compounds and the aqueous salt layer by distillation and recycled to the extraction step for reuse. The solvent-free aqueous salt layer is subsequently acidified with an inorganic acid, and the mixture thus obtained is separated into an acid-rich phase, comprising substantially water-insoluble organic acids, and a water-rich phase which comprises substantially inorganic salts and any water-soluble organic acids that may be present. Particular advantage is obtained, as more fully hereinafter described, in that the aforementioned steps of neutralization, extraction and alkali dilution are carried out within a single piece of equipment.

It is therefore an object of the present invention to provide an improved process for separating water-insoluble organic acids from mixtures thereof with other water-insoluble oxygenated organic compounds.

Another object of the invention is to provide an improved process for separating water-insoluble organic acids from mixtures thereof with water-insoluble alcohols.

Still another object of the invention is to provide an improved process for separating water-insoluble organic acids from mixtures thereof with water-insoluble alcohols, aldehydes, ketones and esters.

Other objects and advantages inherent in the invention will be apparent from the following more detailed disclosure.

The accompanying drawing illustrates, diagrammatically, one form of the apparatus employed and capable of carrying out one embodiment of the process of this invention. While the invention will be described in detail by reference to one embodiment of the process employing the apparatus illustrated in the drawing, it should be noted that it is not intended that the invention be limited to the embodiment as illustrated, but is capable of other embodiments beyond the scope of the apparatus illustrated in the drawing. Pumps, compressors, valves and other mechanical elements necessary to effect the transfer of liquids and vapors and to maintain the conditions of temperature and pressure necessary to carry out the function of the apparatus, are omitted to simplify the description. It will be understood, however, that much equipment of this nature is necessary and will be supplied by those skilled in the art.

Referring to the drawing, a mixture of water-insoluble organic acids and alcohols is supplied through line 10. This mixture may contain in addition, other oxygenated organic compounds comprising aldehydes, ketones and esters, in whole or in part. This mixture is transferred through line 10 to a point near the center of a caustic treater 11. In treater 11 the mixture introduced through line 10 is treated with alkali by countercurrent contact to neutralize the aforementioned organic acids. Alkali thus employed, converts organic acids contained in the aforementioned acid-alcohol mixture to their corresponding organic salts. For this purpose, the mixture thus introduced into treater 11 is intimately mixed with an aqueous alkali in a suitable amount, introduced into treater 11 at an upper point through line 12. In accordance with the process of the invention, such aqueous alkaline solution may comprise a strong solution having a concentration of alkali in the amount of 5% or greater. In this respect, it has been found that caustic solutions in concentrations of approximately 15% to 50% have proved overall satisfactory, in converting organic acids to their salts from acid-alcohol mixtures, as derived from the reaction product obtained in the aforementioned catalytic hydrogenation of oxides of carbon at elevated temperatures.

To facilitate separation of excess alkali and organic salts from the neutralized alcohols and any of the aforementioned oxygenated organic compounds that may have been present in the feed introduced through line 10, the mixture of organic salts, oxygenated organic compounds and excess alkali, is next contacted with water introduced into treater 11 at an upper point above the introduction of the alkali, through line 13. The quantity of water thus utilized is limited to the minimum necessary to effect a suitable separation of organic salts and excess alkali from alcohols and other oxygenated organic compounds or to dilute the alkali to any desired concentration.

In order to effect complete separation of alcohols and other oxygenated organic compounds from organic salts in aqueous solution in treater 11, a light hydrocarbon stream, employed as the solvent treating agent in the instant embodiment of our invention, is introduced at a point near the bottom of treater 11 through line 14. This solvent treating agent comprises a hydrocarbon or a mixture of hydrocarbons, or a hydrocarbon or mixture of hydrocarbons which preferably does not form a minimum boiling azeotrope with the aforementioned alcohols and other oxygenated organic compounds present. We have found such hydrocarbons as butane, pentane or hexane, either individually or in mixtures thereof, to be overall generally suitable as the solvent treating agent as applied to the present process. The admixture of the introduced hydrocarbon stream with salts of organic acids present, tends to confine these salts in the lower aqueous layer which is formed in treater 11. At this point, it will be noted that the introduction of the aforementioned hydrocarbon stream into treater 11 through line 14 as described above, make possible the use of strong caustic solutions for the purpose indicated, without increasing the quantity of water otherwise required to dilute the caustic in order to obtain efficient separation of organic salts from the aforementioned oxygenated organic compounds. Treater 11 may be ordinarily operated at room temperature and at atmospheric pressure. However, it may be desirable to operate at a temperature above or below ambient temperature in order to maintain maximum selectivity of the solvent treating agent. In addition, it may be desirable to operate treater 11 above atmospheric pressure, as when propane is used as the solvent, in order to maintain the solvent in the most selective condition.

As a result of the treatment of the water-insoluble oxygenated organic chemical mixture, introduced into treater 11 through line 10, a phase separation takes place by reason of the insolubility of the hydrocarbon solvent treating agent in the aqueous salt solution and its mutual solubility with the layer of oxygenated organic compounds. Accordingly, there is present in treater 11 an upper hydrocarbon or oil layer comprising proportionately large quantities of the hydrocarbon solvent treating agent, alcohols and other oxygenated organic compounds, which as previously described, may comprise aldehydes, ketones and esters. This upper layer is withdrawn as an extract from treater 11 through line 15. The lower layer in treater 11, comprises an aqueous mixture of salts of organic acids, proportionately small quantities of the hydrocarbon solvent treating agent and excess alkali, and is withdrawn as bottoms through line 16 for further use or treatment in the process hereinafter described.

The extract or oil layer from treater 11, containing the solvent treating agent, alcohols and other oxygenated organic compounds is transferred through line 15 to a distillation tower 17. Tower 17 is operated under conditions effective to separate the aforementioned extract introduced through line 15, into an upper fraction comprising substantially vaporized hydrocarbons, and a lower fraction comprising acid-free alcohols and other oxygenated organic compounds. The vaporized hydrocarbons in tower 17 are withdrawn overhead through line 18 and transferred via line 14, with which line 18 connects for further use as the solvent treating agent in treater 11, in the process hereinbefore described. Make-up treating agent is introduced into treater 11 through line 21, with which line 14 connects. The lower fraction from tower 17, comprising acid-free alcohols and other water-insoluble oxygenated organic compounds, is withdrawn as a bottom through line 22 for further treatment outside the scope of the present process to obtain separation of individual components, where so desired.

As described above, the lower layer in treater 11, comprising an aqueous mixture of salts of organic acids, proportionately small quantities of the hydrocarbon solvent treating agent and excess alkali is withdrawn as bottoms through line 16. This mixture is next transferred through line 16 to a distillation tower 23. In tower 23, the mixture is heated under proper operating conditions of temperature and pressure effective to distill overhead the solvent treating agent, which is withdrawn through line 24 and is recycled via line 14, with which line 24 connects, and is thus transferred for reuse in treater 11, in the process hereinbefore described. Bottoms from tower 23, comprising an aqueous mixture of salts of organic acids and excess alkali, are withdrawn through line 25.

Bottoms from tower 23 comprising an aqueous mixture of salts of organic acids and excess alkali, as described above, are transferred through line 25 to a mixer 28. Mixer 28 is provided to intimately mix the mixture introduced through line 25, with an inorganic acid which is introduced into line 25 through line 29, in order to effect complete regeneration of the organic acids from the salts. The inorganic acid thus introduced into mixer 28, may be a high boiling inorganic acid having a boiling point higher than that of water, such as sulfuric acid, or an inorganic acid which forms a maximum boiling azeotrope with water, such as hydrochloric acid.

The resulting aqueous mixture from mixer 28, comprises free organic acids and alkali salts of the introduced inorganic acid. This mixture is withdrawn from mixer 28, through line 30, and transferred to a separator 31. In separator 31 heavier organic acids will separate from the water solution by reason of their insolubility. These acids, comprising an upper acid-rich phase in separator 31, are withdrawn overhead through line 32 for further treatment outside the scope of the present process, to obtain separation of individual acids where so desired.

The lower water-rich phase in separator 31, comprising inorganic salts, any excess quantities of the introduced inorganic acid and light organic acids, is withdrawn as bottoms from separator 31 through line 33. This lower water-rich phase is next transferred through line 33 to a low point in a distillation tower 34, which functions as an acid stripper. Tower 34 is heated under conditions effective to distill overhead the light organic acids as their water azeotropes which are withdrawn through line 35, and may be subjected to further treatment, outside the scope of the present process, to obtain separation of individual acids where so desired. Bottoms from tower 34, comprising inorganic salts, excess quantities of the introduced inorganic acid and water are withdrawn through line 36 for further use or treatment outside the scope of the present process. It should be noted that where so desired separation of organic acids in line 33 may be effected by extraction processes known to those skilled in the art, instead of by distillation, as described above.

As an example of the efficacy of the aforementioned process, as demonstrated by laboratory operations in accordance with the above described procedure, a mixture of water-insoluble alcohols, aldehydes, ketones, esters, and organic acids, containing 35 weight percent of a mixture of organic acids having a molecular weight equivalent to the molecular weight of heptanoic acid, was neutralized with a 15% sodium hydroxide solution. It was observed upon the admixture of the acids with the caustic, that no phase separation was obtained between acids, as their organic salts, and remaining oxygenated organic compounds. However, upon the addition of pentane, in the ratio of one volume pentane per volume of the aforementioned acid-oxygenated chemicals mixtures, complete phase separation was obtained between organic acid salts and other oxygenated organic compounds present in the initial mixture.

To recapitulate, the present invention is directed to an improved process for the separation of water-insoluble organic acids from mixtures thereof with water-insoluble alcohols and other oxygenated organic compounds, present in the oil or non-aqueous liquid product obtained from the condensation of reactor gases in the catalytic hydrogenation of oxides of carbon at elevated temperatures. However, while the invention has been described as having a particular applicability to the separation of such compounds obtained from the source indicated, it should be noted that the process of the invention is not necessarily restricted to effect the desired separation of these compounds as derived from the aforementioned source. The process of the invention may be also successfully applied to the separation of any mixtures of the aforementioned compounds, without regard to the source from which these mixtures may have been derived and without regard to the relative proportions of the components comprising such mixtures. It should be also noted that while we have shown the aforementioned steps of neutralization, extraction and alkali dilution as being carried out in a single piece of equipment as exemplified by treater 11, the aforementioned steps can be also successfully carried out in separate pieces of equipment, each respectively designed to carry out the aforementioned functions.

In addition, while we have described a particular embodiment of our invention for purposes of illustration, it should be understood that various modifications and adaptations thereof, which will be obvious to one skilled in the art, may be made within the spirit of the invention as set forth in the appended claims.

Having thus described our invention, what we claim and desire to secure by Letters Patent is:

1. A process for separating organic acids and alcohols from a mixture thereof, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and a raffinate phase comprising alkali salts; and separating said phases.

2. A process as defined in claim 1 wherein said solvent is a liquid oxygenated organic compound.

3. A process as defined in claim 1 wherein said solvent is ethyl acetate.

4. A process as defined in claim 1 wherein said solvent is a liquid hydrocarbon.

5. A process as defined in claim 1 wherein said solvent is a liquid hydrocarbon which does not form a minimum boiling azeotrope with said alcohols.

6. A process as defined in claim 1 wherein said solvent is pentane.

7. A process for separating organic acids and alcohols from a mixture thereof, which comprises: introducing a water-insoluble solvent into the lower portion of a reaction zone; introducing an alkali into the upper portion of said zone; introducing water into said zone at a point above the point of introduction of said alkali; introducing the mixture of said acids and alcohols into said zone at a point between the points of introduction of said water-insoluble solvent and said alkali to form an extract phase comprising alcohols and a raffinate phase comprising alkali salts; and separating said phases.

8. A process for seprating organic acids and alcohols from a mixture thereof, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and a raffinate phase comprising alkali salts; separating said phases; recovering solvent from said extract phase; and passing solvent thus recovered to said first-mentioned treatment of said mixture of organic acids and alcohols to supply at least a portion of the solvent to said treatment.

9. A process for separating organic acids and alcohols from a mixture thereof, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and solvent and a raffinate phase comprising alkali salts and solvent; separating said phases; recovering solvent from each of said phases; and passing solvent thus recovered to said first-mentioned treatment of said mixture of organic acids and alcohols to supply at least a portion of the solvent to said treatment.

10. A process for separating organic acids and alcohols from a mixture thereof obtained in a process for the catalytic hydrogenation of an oxide of carbon, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and a raffinate phase comprising alkali salts; and separating said phases.

11. A process for separating organic acids and alcohols from a mixture thereof obtained in a process for the catalytic hydrogenation of an oxide of carbon, which comprises: introducing a water-insoluble solvent into the lower portion of a reaction zone; introducing an alkali into the upper portion of said zone; introducing water into said zone at a point above the point of introduction of said alkali; introducing the mixture of said acids and alcohols into said zone at a point between the points of introduction of said water-insoluble solvent and said alkali to form an extract phase comprising alcohols and a raffinate phase comprising alkali salts; and separating said phases.

12. A process for separating organic acids and alcohols from a mixture thereof obtained in a process for the catalytic hydrogenation of an oxide of carbon, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and solvent and a raffinate phase comprising alkali salts; separating said phases; recovering solvent from said extract phase; and passing solvent thus recovered to said first-mentioned treatment of said mixture of organic acids and alcohols to supply at least a portion of the solvent to said treatment.

13. A process for separating organic acids and alcohols from a mixture thereof obtained in a process for the catalytic hydrogenation of an oxide of carbon, which comprises: introducing a water-insoluble solvent into the lower portion of a reaction zone; introducing an aqueous solution of an alkali into the upper portion of said zone; introducing the mixture of said acids and alcohols into said zone at a point between the points of introduction of said water-insoluble solvent and said aqueous alkali solution to form an extract phase comprising alcohols and solvent and a raffinate phase comprising alkali salts and solvent; separating said phases; recovering solvent from each of said phases; and passing solvent thus recovered to said first-mentioned treatment of said mixture of organic acids and alcohols to supply at least a portion of the solvent to said treatment.

WILLIAM P. BURTON.
HENRY G. McGRATH.
LOUIS C. RUBIN.

REFERENCES CITED

The following references are of record in the file of this patent:

UNITED STATES PATENTS

| Number | Name | Date |
| --- | --- | --- |
| 2,055,095 | Beller et al. | Sept. 22, 1936 |
| 2,059,232 | Harder | Nov. 3, 1936 |
| 2,171,324 | Zetzsche et al. | Aug. 29, 1939 |
| 2,193,321 | Leithe | Mar. 12, 1940 |

FOREIGN PATENTS

| Number | Country | Date |
| --- | --- | --- |
| 250,563 | Great Britain | Aug. 29, 1927 |
| 350,502 | Great Britain | June 15, 1931 |

OTHER REFERENCES

Koch et al., Brenn. Chem. 16, 382–387 (1935).